US010089792B2

(12) United States Patent
Weerasinghe

(10) Patent No.: US 10,089,792 B2
(45) Date of Patent: *Oct. 2, 2018

(54) VIRTUAL DOORBELL AUGMENTATIONS FOR COMMUNICATIONS BETWEEN AUGMENTED REALITY AND VIRTUAL REALITY ENVIRONMENTS

(71) Applicant: AT&T Intellectual Property I, L.P., Atlanta, GA (US)

(72) Inventor: Srilal M. Weerasinghe, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,015

(22) Filed: May 8, 2017

(65) Prior Publication Data

US 2017/0243402 A1 Aug. 24, 2017

Related U.S. Application Data

(63) Continuation of application No. 14/620,371, filed on Feb. 12, 2015, now Pat. No. 9,646,400.

(51) Int. Cl.
*G09G 5/00* (2006.01)
*G06T 19/00* (2011.01)
(Continued)

(52) U.S. Cl.
CPC ............ *G06T 19/006* (2013.01); *H04L 63/08* (2013.01); *H04L 63/105* (2013.01); *H04N 7/186* (2013.01)

(58) Field of Classification Search
None
See application file for complete search history.

(56) References Cited

U.S. PATENT DOCUMENTS 8,400,548 B2 3/2013 Bilbrey et al.
8,433,336 B2 4/2013 Lee et al.
(Continued)

FOREIGN PATENT DOCUMENTS

AU 2013213701 2/2014

OTHER PUBLICATIONS

Azuma et al., "Recent Advances in Augmented Reality," Computer Graphics and Applications, IEEE 21.6, Nov. 2001.
(Continued)

*Primary Examiner* — Xiao Wu
*Assistant Examiner* — Mohammad H Akhavannik
(74) *Attorney, Agent, or Firm* — Hartum & Citrin LLC

(57) ABSTRACT

Concepts and technologies are disclosed herein for virtual doorbell augmentations for communications between augmented reality and virtual reality environments. According to one aspect, an augmented reality server computer can provide an augmented reality environment to a user device. The augmented reality environment can include a view of a physical, real-world environment and a virtual doorbell augmentation applied to a residence depicted in the view of the physical, real-world environment. The augmented reality server computer can receive a selection of the virtual doorbell augmentation. In response to receiving the selection of the virtual doorbell augmentation, the augmented reality server computer can request access to a virtual reality environment provided by a virtual reality server computer associated with the residence.

20 Claims, 7 Drawing Sheets

(51) Int. Cl.
*H04L 29/06* (2006.01)
*H04N 7/18* (2006.01)

(56) References Cited

U.S. PATENT DOCUMENTS

| | | |
|---|---|---|
| 8,842,003 B2 | 9/2014 | Huston |
| 2009/0303507 A1 | 12/2009 | Abeloe |
| 2011/0199479 A1 | 8/2011 | Waldman |
| 2013/0174213 A1 | 7/2013 | Liu |
| 2013/0222373 A1 | 8/2013 | Weinstein et al. |
| 2013/0257858 A1 | 10/2013 | Na et al. |
| 2013/0293584 A1 | 11/2013 | Anderson |
| 2014/0063055 A1 | 3/2014 | Osterhout et al. |
| 2014/0063058 A1 | 3/2014 | Fialho et al. |
| 2014/0139519 A1 | 5/2014 | Mit |
| 2014/0244160 A1 | 8/2014 | Cragun et al. |
| 2014/0278053 A1 | 9/2014 | Wu et al. |
| 2014/0330511 A1 | 11/2014 | Tison et al. |
| 2015/0074781 A1 | 3/2015 | Boss |

OTHER PUBLICATIONS

Feiner et al., "A Touring Machine: Prototyping 3D Mobile Augmented Reality Systems for Exploring the Urban Environment," Personal Technologies 1(4), 1997, pp. 208-217.
U.S. Office Action dated Jun. 28, 2016 in U.S. Appl. No. 14/620,371.
U.S. Notice of Allowance dated Dec. 15, 2016 in U.S. Appl. No. 14/620,371.

US 10,089,792 B2

VIRTUAL DOORBELL AUGMENTATIONS FOR COMMUNICATIONS BETWEEN AUGMENTED REALITY AND VIRTUAL REALITY ENVIRONMENTS

CROSS-REFERENCE TO RELATED APPLICATIONS

This application is a continuation of U.S. patent application Ser. No. 14/620,371, now U.S. Pat. No. 9,646,400, entitled "Virtual Doorbell Augmentations for Communications Between Augmented Reality and Virtual Reality Environments," filed Feb. 12, 2015, which is incorporated herein by reference in its entirety.

BACKGROUND

Mapping services such as MAPQUEST™ mapping service (available from AOL Inc.) and GOOGLE MAPS™ mapping service (available from Google Inc.) provide static maps generated from multiple images, such as satellite, aerial, and street-level images. Augmented reality ("AR") street maps also exist. AR street maps may utilize the static map images provided by mapping services and modify the static map images with one or more virtual objects, which may contain additional information such as name, address and/or other identifying information, rating and/or review information, distance from present location, web links, and/or other information. Currently, AR applications are limited to commercial and public locations, and no attempts have been made to extend the capabilities to residences. This is understandable given the privacy concerns of home owners and renters. Allowing strangers to peek inside one's residence is a security risk, and as a consequence, residential environments are currently not engineered to interact with AR street maps.

SUMMARY

Concepts and technologies are disclosed herein for virtual doorbell augmentations for communication between augmented reality and virtual reality environments. According to one aspect of the concepts and technologies disclosed herein, an augmented reality server computer can provide an augmented reality environment to a user device. The augmented reality environment can include a view of a physical, real-world environment and a virtual doorbell augmentation applied to a residence depicted in the view of the physical, real-world environment. The augmented reality server computer can receive a selection of the virtual doorbell augmentation. In response to receiving the selection of the virtual doorbell augmentation, the augmented reality server computer can request access to a virtual reality environment provided by a virtual reality server computer associated with the residence.

In some embodiments, the view of the physical, real-world environment includes a live view of the physical, real-world environment. In some other embodiments, the view of the physical, real-world environment includes a non-live view of the physical, real-world environment. In these embodiments, the non-live view can present a physical, real-world environment as a static map such as a map provided by a mapping service.

In some embodiments, the virtual doorbell augmentation includes a virtual object overlay that overlays at least a portion of the view of the physical, real-world environment. In some other embodiments, the virtual doorbell augmentation includes a spatially integrated virtual object that is spatially integrated with a physical object visible within the view of the physical, real-world environment.

In some embodiments, the augmented reality server computer can provide a request to access at least a portion of the virtual reality environment provided by the virtual reality server computer associated with the residence. The request can include a credential for use by the virtual reality server computer to determine a level of access to the virtual reality environment.

According to one aspect of the concepts and technologies disclosed herein, a virtual reality server computer can receive, from an augmented reality server computer, a request to access a virtual reality environment associated with a residence. The request can be made in response to a selection of a virtual doorbell augmentation from an augmented reality environment presented by the augmented reality server computer. In response to receiving the request, the virtual reality server computer can determine a level of access to the virtual reality environment. The virtual reality server computer can provide access to the virtual reality environment in accordance with the level of access. In some embodiments, the virtual reality server computer is located inside the residence.

In some embodiments, the request includes a credential. The virtual reality server computer can evaluate the credential to determine the level of access to the virtual reality environment.

In some embodiments, in response to receiving the request, the virtual reality server computer can provide access to a walled garden area of the virtual reality environment while determining the level of access to the virtual reality environment. The level of access can be a full level of access to the virtual reality environment or a limited level of access to the virtual reality environment.

In some embodiments, the virtual reality server can allow a physical object to be left for a resident of the residence. The physical object, in some embodiments, is or includes a 3D printed object printed by a 3D printer located inside the residence.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
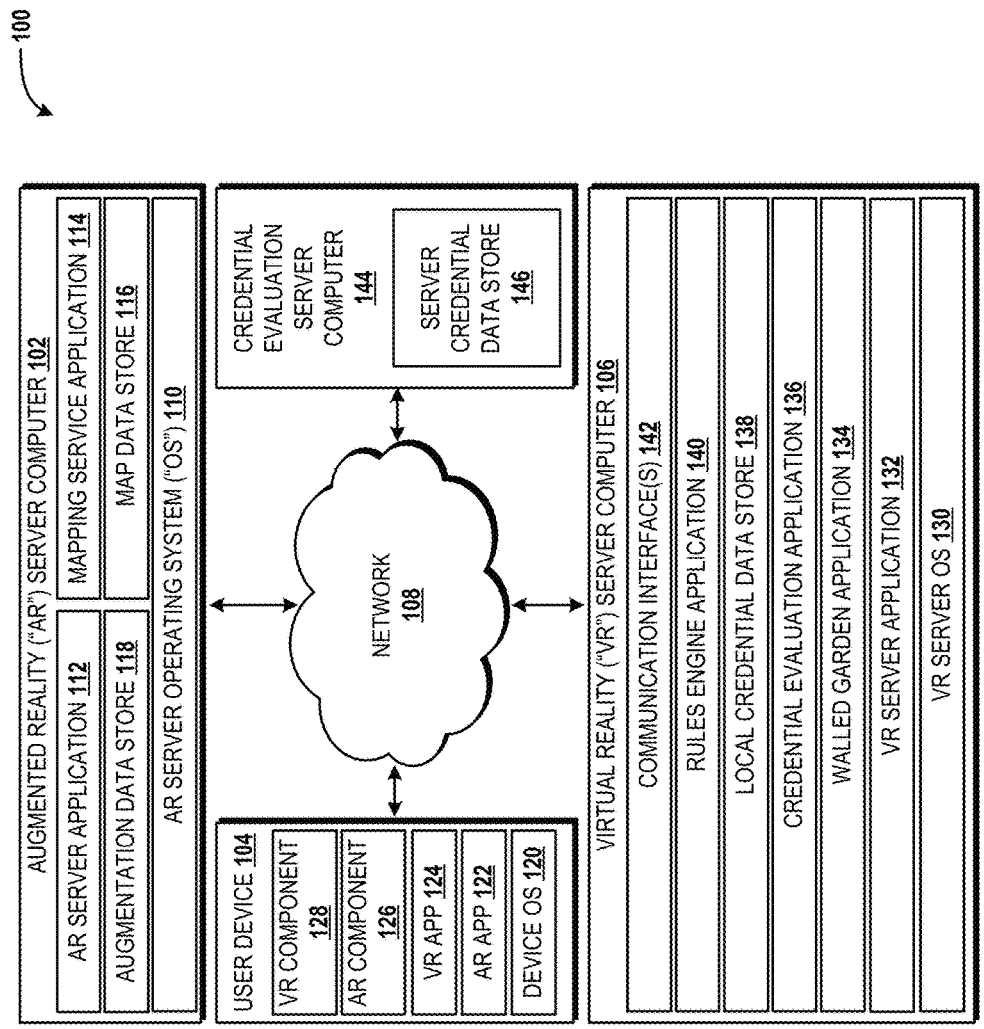
FIG. 1 is a block diagram illustrating aspects of an illustrative operating environment for various concepts disclosed herein.

The concepts and technologies disclosed herein provide virtual doorbell augmentations for communications between augmented reality ("AR") and virtual reality ("VR") environments. The concepts and technologies disclosed herein are non-obtrusive with security built-in to reject intruders, spam, and other potential malicious behavior. A server computer is described that provides mediation functions for communications between a VR environment (e.g., a residence) and one or more AR mapping services. To allay privacy concerns, the server can utilize a walled-garden approach, which can be combined with a credence index to validate and rank visitors to allow no, limited, or full access to the VR environment.

In the past, each residence typically had a central physical location for message retrieval. At various times this function was fulfilled by paper and pencil or a dry erase board on a side-table at the entrance/foyer to the home or kitchen counter, table, or the like. Later, the home answering machine provided a central physical location for message retrieval. In both of these scenarios, messages received at the central physical location were directed to any of the occupants of a particular residence.

The Information Age (also known as the Computer Age or Digital Age), however, has replaced the old, centralized model of message retrieval with cell phones, voicemail, email, and text messaging. This new model is no longer centralized or conceptually tied to a particular residence, and instead provides decentralized and personalized message retrieval to the individual level.

The centralized model is making a comeback, thanks to a new technology trend colloquially known as the "smart" home. Managing the connected or "smart" home utilizes a central hub. The other development is in home networking. Multimedia residential gateways and other smart home technologies are inherently centralized to communicate via a cloud computing platform. Considering these trends, a centralized intelligent computer will become commonplace in residence of the future, whether physically residing in the residence or off-site in a cloud computing platform.

In accordance with the concepts and technologies disclosed herein, a central communication server (referred to herein as a VR server computer) can provide novel VR functionalities to seamlessly interact with AR maps, such as those described above. The concepts and technologies described herein provide a VR creation application in the VR server computer, so that each residence is capable of presenting a VR environment representative of that particular residence. Additional details regarding this and other aspects of concepts and technologies of virtual doorbell augmentations for communications between AR and VR environments will be provided herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of virtual doorbell augmentations for communications between AR and VR environments. will be presented.

Referring now to FIG. 1, aspects of an operating environment 100 in which various embodiments presented herein may be implemented will be described, according to an illustrative embodiment. The illustrated operating environment 100 includes an augmented reality ("AR") server computer 102. The AR server computer 102 can provide an AR service to one or more user devices such as a user device 104. The operating environment 100 also includes a virtual reality ("VR") server computer 106. The VR server computer 106 can provide a VR service to one or more user devices such as the user device 104. In some embodiments, the VR server computer 106 provides a VR service in association with one or more residences, and in this regard may also be referred to herein as a "residential server." It should be understood, however, that the VR server computer 106 may provide a VR service in association with other non-residential buildings. The AR server computer 102, the user device 104, and the VR server computer 106 are shown in FIG. 1 as operating in communication with and/or as part of a communication network ("network") 108. The network 108 can include multiple networks as will be described in greater detail below with reference to FIG. 6.

The AR server computer 102 can execute an AR server operating system ("OS") 110 and one or more application programs such as, for example, an AR server application 112 and a mapping service application 114. The AR server OS 110 is a computer program for controlling the operation of the AR server computer 102. The AR server application 112 and the mapping service application 114 are executable programs configured to execute on top of the AR server OS 110 to provide various functions.

The AR server application 112 can provide an AR service to user devices such as the user device 104. "Augmented reality" or "AR" is used herein to describe a concept in which at least a portion of a physical, real-world environment is augmented to include computer-generated data. The computer-generated data can include virtual objects that are presented over and/or spatially integrated with real-world objects of the physical, real-world environment. The virtual objects can include text, colors, patterns, gradients, graphics, other images, videos, animations, combinations thereof, and the like. Computer-generated data that augments in some manner a view of a physical, real-world environment and/or elements thereof is referred to herein generally as an "augmentation."

In some embodiments, an AR service can provide a live view of a physical, real-world environment. In these embodiments, the AR service may utilize a camera component (best shown in FIG. 7) of the user device 104 to provide a live view of the physical, real-world environment to be augmented. In other embodiments, the AR service can provide a non-live view of a physical, real-world environment. In these embodiments, the non-live view can present a physical, real-world environment as a static map such as a map provided by the mapping service application 114. Accordingly, a reality that is to be augmented need not be a present reality and can instead be a past reality, encapsulated in a photograph, a map, or the like, that is augmented at a later time such as the present.

According to embodiments disclosed herein, the AR server application 112 can provide an AR mapping service to the user device 104. The AR mapping service can provide the user device 104 access to one or more AR maps, which can be presented to a user of the user device 104 via a display (best shown in FIG. 7) and/or another component of or in communication with the user device 104 as will be described below.

An "augmented reality map" or "AR map" as used herein, can include map imagery to which one or more augmentations are applied. The map imagery can include one or more satellite images, one or more aerial images, one or more street-level images, one or more other map images, or some combination thereof. Moreover, the map imagery can include one or more map elements such as, but not limited to, residential and commercial buildings, other structures, highways, roads, points of interest (e.g., parks, campgrounds, landmarks, and monuments), airports, bus stations, railway stations, subway stations, other public transportation, physical landscape features (e.g., mountains, rivers, lakes, and other water sources), the like, and combinations thereof. In some embodiments, the map imagery is static and is representative of one or more map elements, such as those described above, at a time in the past. In some other embodiments, the map imagery is dynamic, such as a live view of input received by a video camera or other component of or in communication with the user device 104. A combination of static and dynamic imagery in a single AR map is also contemplated.

An augmentation of an AR map can include a virtual object overlay positioned over at least a portion of the map imagery of a map so that the user can view additional data associated with one or more map elements depicted on the map. An augmentation of an AR map can include a virtual object that is spatially integrated with one or more map elements depicted on the map. The virtual object can include data such as, but not limed to, name, address, and/or other identifying information; rating, review, and/or other critique information; distance from a current location of the user device 104 and/or other distance information; one or more uniform resource locator(s) and/or other link information; and/or other information associated with one or more elements depicted on the map. For example, an augmentation might be a storefront icon, the selection of which by a user directs the user device 104 to a virtual store through which the user can browse and/or purchase merchandise. Augmentations can take other forms to provide functionality particular to a location shown on a map. For example, the selection of a movie theater icon may cause an associated web page to be displayed. The web page can provide a list of show times for one or more movies currently playing at the corresponding theater location. Other augmentations known to those skilled in the art are also contemplated, and as such, the aforementioned examples should not be construed as limiting the augmentations that the AR map server computer 102 can provide via one or more AR maps.

Figure 2:
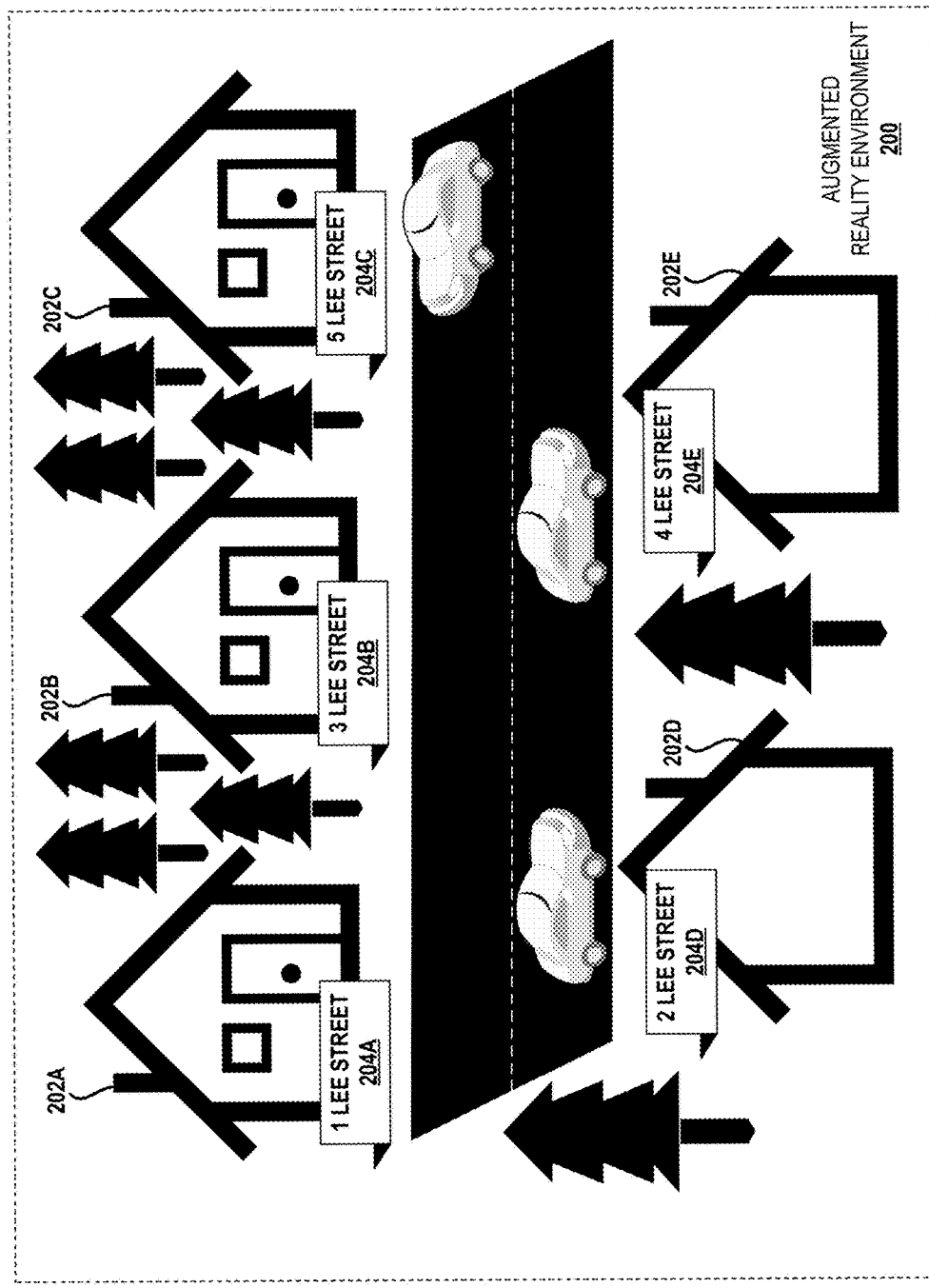
FIG. 2 is a diagram illustrating aspects of an augmented reality ("AR") environment provided, at least in part, by an AR server computer to a user device over a network, according to an illustrative embodiment.
Figure 3:
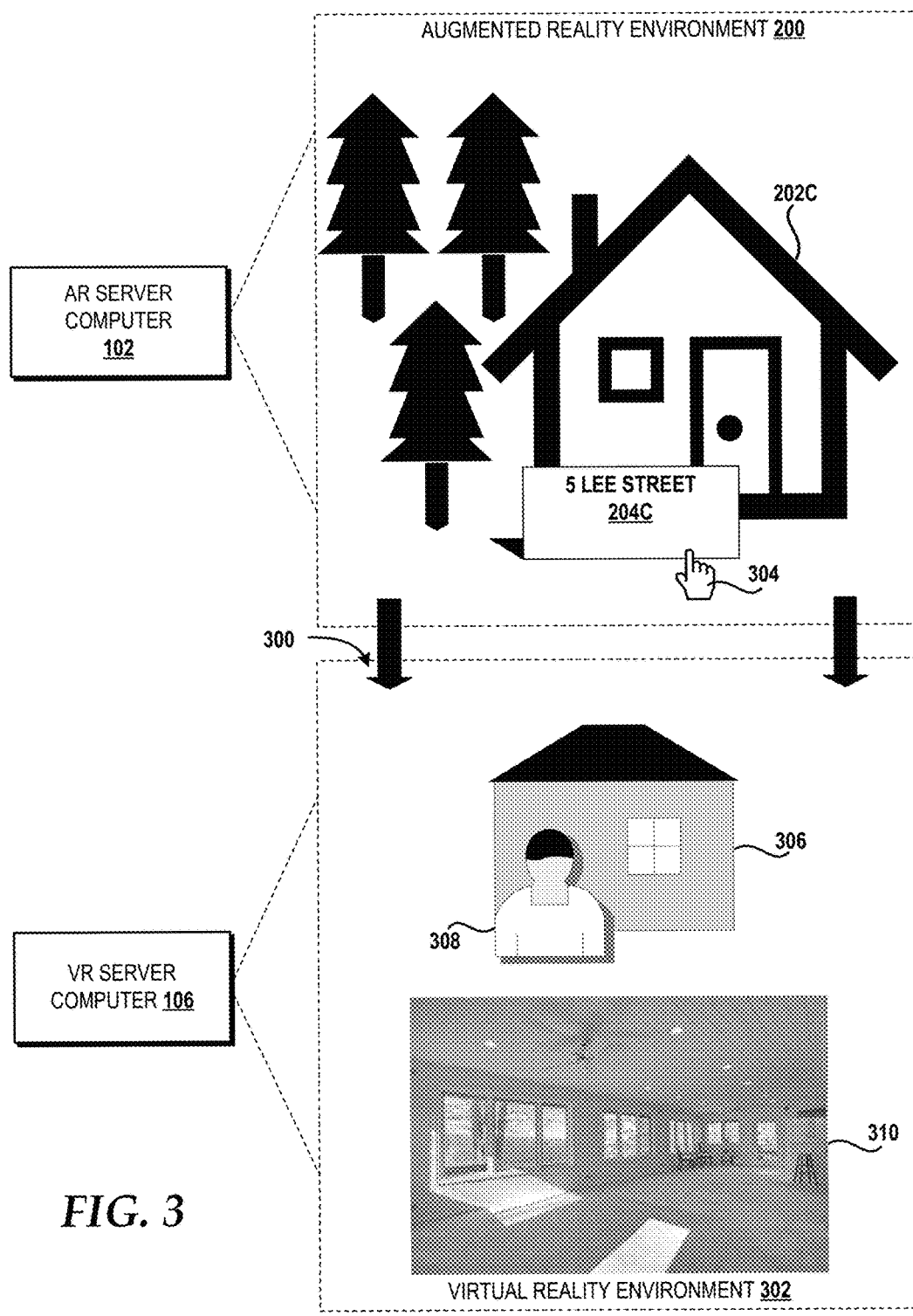
FIG. 3 is a diagram illustrating aspects of a transition from an AR environment provided, at least in part, by an AR server computer to a virtual reality ("VR") environment provided, at least in part, by a VR server computer, according to an illustrative embodiment.

The concepts and technologies described herein provide a new type of augmentation referred to herein as a "virtual doorbell augmentation." A "virtual doorbell augmentation" is a new type of augmentation that augments a view of a physical, real-world environment and/or elements thereof with a virtual object overlay or spatially integrated virtual object to indicate the availability of a connection to a VR environment associated with a particular element with which the overlay is associated. In accordance with one embodiment disclosed herein, and as best shown in FIGS. 2-3, a virtual doorbell augmentation can include a doorbell image, a sign graphic, or other image that overlays or that is spatially integrated with at least a portion of a house or other residence (e.g., a condominium or an apartment) on an interface displayed by the user device 104 and/or an associated component.

After an AR map is created, a virtual representation of at least a portion of each virtual property can be associated with a corresponding brick-and-mortar real property. Verifying user credentials and assigning virtual property to the rightful owner is a pre-requisite. This could also be done by local and/or state governments for additional revenue. Another logical entity is the United States Post Office. The United States Post Office can take up this role to generate a new revenue stream, for example.

The illustrated AR server computer 102 also includes a mapping service application 114. The mapping service application 114, in some embodiments, can create maps to which the AR server application 112 can add augmentation(s). The mapping service application 114, in other embodiments, can utilize one or more application programming interface ("API") calls to call one or more functions provided by one or more APIs exposed by an external mapping service (not shown) to access one or more maps created by the external mapping service. The external mapping service can be or can include a service such as, for example, the MAPQUEST™ mapping service (available from AOL Inc.) or the GOOGLE MAPS™ mapping service (available from Google Inc.). The AR server computer 102 can store or cache maps in a map data store 116. The maps stored or caches in the map data store 116 may be created by the mapping service application 114, the external mapping service, or a combination of both. Moreover, the map data store 116 can store AR maps created, at least in part, by the AR server application 112.

The illustrated AR server computer 102 also includes an augmentation data store 118. The augmentation data store 118 can store or cache augmentations created by the AR server application 112 and/or any external source (not shown). An external source may be, for example, an entity that owns and/or operates an element (e.g., a restaurant) that is to be depicted in one or more AR maps, and would like to augment a view of the element with computer-generated data.

According to various embodiments, the functionality of the AR server computer 102 may be provided by a single device, by two similar devices, and/or by two or more dissimilar devices. Additional details regarding hardware and software components of an exemplary computer architecture that the AR server computer 102 may utilize will be described herein below with reference to FIG. 5.

The illustrated user device 104 can be or can include one or more mobile telephones, smartphones, tablet computers, slate computers, smart watches, fitness devices, smart glasses (e.g., the GOOGLE GLASS family of products), other wearable devices, mobile media playback devices, laptop computers, notebook computers, ultrabook computers, netbook computers, computers of other form factors, computing devices of other form factors, other computing systems, other computing devices, and/or the like. It should be understood that the functionality of the user device 104 can be provided by a single device, by two or more similar devices, and/or by two or more dissimilar devices. For purposes of describing the concepts and technologies disclosed herein, the user device 104 is described herein as a smartphone. It should be understood that this embodiment is illustrative, and should not be construed as being limiting in any way.

The illustrated user device 104 includes a device OS 120, an AR app 122, a VR app 124, an AR component 126, and a VR component 128. It should be understood, however, that the user device 104 can include other components. An illustrative example architecture of the user device 104 is described in greater detail herein with reference to FIG. 7.

The device OS 120 can control the operation of the user device 104. In some embodiments, the device OS 120 includes the functionality of the AR app 122 and/or the VR app 124, both of which are described in greater detail below. The device OS 120 can be executed by one or more processors (best shown in FIG. 7) to cause the user device 104 to perform various operations. The device OS 120 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The AR app 122 and the VR app 124 can execute on top of the device OS 120. The AR app 122 and the VR app 124 can be executed by one or more processors (best shown in FIG. 7) to cause the user device 104 to perform various operations described herein.

The AR app 122 can be a client-side application that communicates, via the network 108, with the AR server application 112 executing on the AR server computer 102 to provide, at least in part, an AR service to the user of the user device 104. For example, the AR app 122 can communicate with the AR server application 112 to obtain augmentation data that is stored in the augmentation data store 118. The augmentation data can be used to augment a reality perceived by the user device 104 via an AR component 126 (e.g., as embodied as a video camera component of the user device 104). The AR app 122 also can communicate, via the network 108, with the mapping service application 114 executing on the AR server computer 102 to retrieve one or more maps to which the augmentation data obtained from the augmentation data store 118 can be applied by the AR app 122. The AR app 122 also can communicate, via the network 108, with the AR server application 112 to obtain one or more AR maps created by the AR server computer 102 or another entity.

The AR app 122, in some embodiments, can utilize the AR component 126 to provide, at least in part, an AR service to the user of the user device 104. The illustrated embodiment of the AR component 126 represents the AR component 126 as an internal component of the user device 104. It should be understood that the AR component 126 alternatively may be an external component that is in communication with the user device 104 via a wired or wireless connection. The AR component 126, in some embodiments, is or includes a camera (e.g., a still camera and/or video camera), a sensor (e.g., an accelerometer, a global positioning system sensor, a solid state compass, or the like), a display (e.g., an integrated display, a head-mounted display, an eyeglasses display, a head-up display, an external monitor, a projection system, or a holographic display), an input device, or the like.

The VR server computer 106 can execute a VR server OS 130 and one or more application programs such as, for example, a VR server application 132, a walled garden application 134, a credential evaluation application 136, which can access local credentials stored on the VR server computer 106 in a local credential data store 138, and a rules engine application 140. The VR server OS 130 is a computer program for controlling the operation of the VR server computer 106. The VR server application 132, the walled garden application 134, the credential evaluation application 136, and the rules engine application 140 are executable programs configured to execute on top of the VR server OS 130 to provide various functions.

The VR server application 132 can provide a VR service to user devices such as the user device 104. "Virtual reality" or "VR" is used herein to describe a concept that provides a computer-generated environment (also referred to herein as a "virtual" environment") that a user can explore via a device, such as the user device 104. A VR environment can be a computer-generated representation or at least an approximation of at least a portion of a physical, real-world environment. For example, in accordance with an embodiment of the concepts and technologies disclosed herein, a residential environment, such as a house, can be simulated by the VR server application 132 to provide users with a view of at least a portion of a virtual interior of the house. The user can access the VR environment by selecting or "ringing" a virtual doorbell augmentation associated with the house. This concept will be described in greater detail below.

The VR environment can be at least partially different from the physical, real-world environment of which the VR environment is representative. The VR environment can include virtual objects not found in the corresponding physical, real-world environment. Lighting effects such light bloom and other effects can be applied to the VR environment to create atmosphere. Moreover, natural phenomena such as gravity can be simulated in the virtual environment.

The VR environment can provide, at least in part, a sensory experience for a user. The sensory experience can include sight, sound, virtual taste, virtual smell, and virtual touch aspects to make the user feel as if he or she is physically located within the virtual environment. Those skilled in the art will appreciate the variety of sensory experiences that can be provided via virtual reality, and as such, additional details in this regard are not provided.

Through a VR experience, a user can explore, via the user device 104, a VR environment that is representative of at least a portion of the house or other residence associated with the virtual doorbell augmentation. By way of example, and not limitation, the VR environment can include one or more interior rooms of a house, landscaping of the house, one or more exterior views of the house, and the like. The VR environment can be generated by any software framework designed for the creation and development of graphics. Some example software frameworks include, but are not limited to, UNREAL ENGINE (available from Epic Games), UNITY (available from Unity Technologies), CRYENGINE (available from Crytek), HAVOK VISION ENGINE (available from Havok), and open source software frameworks. In some embodiments, the software frameworks utilize graphics assets, such as textures, that include or are derived from photographs of the real-world environment that is to be virtualized. Those skilled in the art will appreciate the wide range of graphical fidelity, visual styles, and other attributes a particular VR environment may have, and as such, further details in this regard are not provided herein.

In some embodiments, the VR experience can facilitate transmission of mail electronically to a home address. For example, mail such as business letters, service bills, sales notifications, coupons, and junk mail can be delivered as virtual objects for presentation within the VR environment. In some other embodiments, the VR experience can facilitate communication between the user device 104 and the VR server computer 106 so that the user can leave a physical object within the house. For example, a 3D printer in communication with the VR server computer 106 can receive instructions regarding the physical object and can print the physical object for a resident of the house. The physical object may be, for example, a gift, a sample product, a 3D greeting card, or any other 3D-printable object. In some embodiments, a business can provide samples to customers via this methodology.

The VR server computer 106, in some embodiments, can provide dedicated functionality to a house or other residence. In some embodiments, the VR server computer 106 or the functionality of the VR server computer 106 is included in a home server, a residential gateway device, or other smart home device. The VR server computer 106 can interface, via one or more communication interfaces 142, with the AR server computer 102, the user device 104, and/or a credential evaluation server computer 144. The communication interface(s) 142 can interface with the network 108 over which the VR server computer 106 can receive requests from virtual visitors and credentials in response to a user's interaction with a virtual doorbell augmentation associated with the VR server computer 106.

A virtual doorbell augmentation can be associated with an owner of the property located at a physical address. In this manner, when a user selects or "rings" the corresponding virtual doorbell augmentation through an interaction with a graphical user interface ("GUI") of the AR app 122 presented via the user device 104, the user device 104 is connected to the residential server associated with that address.

The walled garden application 134 can provide restricted access to visitors of a VR environment provided by the VR server application 132. A "visitor" as used herein can be a human user, such as the user associated with the user device 104. A visitor alternatively can be a server, such as the AR server computer 102 and/or one or more other servers (not shown), or another computing system or device that programmatically generates requests to access the VR environment provided by the VR server application 132.

The walled garden application 134 can restrict visitor access to a designated portion of the VR environment while user credentials (e.g., username and password and/or the like) are verified by the credential evaluation application 136. Other visitors can explore the designated portion of the VR environment before deciding whether to provide their credentials with a request to access at least another portion of the virtual environment. In this manner, the walled garden application 134 can limit visitor access based upon the trustworthiness or "credibility" of the visitor. For example, a request from a pre-qualified visitor (e.g., a friend, family member, or frequent visitor) may be considered trustworthy, and therefore may bypass the walled garden application 134 in some implementations.

Visitor credibility can be established via credential evaluation operation performed by the credential evaluation application 136. In some embodiments, the credential evaluation application 136 can compare user credentials received in a request to access the VR environment to user credentials stored in the local credential data store 138. In some embodiments, the VR server computer 106 can communicate with the credential evaluation server computer 144 to compare user credentials received in a request to access the VR environment to user credentials stored in a server credential data store 146.

In some embodiments, the credential evaluation application 136 can utilize a credence index to rank visitors. The credence index can be a measure of authenticity or trust of a visitor (e.g., human or machine generated requests). In some embodiments, the credence index can be or can include a data table with entries for each visitor type and an allowed access level for each visitor type. The data table, in some embodiments, is at least partially pre-populated for known users. The data table, in some embodiments, additionally or alternatively can utilize a learning algorithm to add new entries based upon one or more actions taken by a designated resident of the residence in response to a request. In some implementations, unknown visitors with unrecognized user credentials (e.g., unrecognized user login name, password, email address, and/or the like) are assigned the lowest credence index ranking, such as only allowing access to a walled garden area, and then notify a designated resident of the residence to allow the designated resident to perform one or more actions in response.

In some embodiments, the credential evaluation application 136 can determine a visitor type associated with each request. In these embodiments, a visitor profile available to the AR server computer 102 can be evaluated and provided to the VR server computer 106. The credential evaluation application 136, executed by the VR server computer 106, can determine a visitor type based upon the visitor profile. Each visitor request can be originated by a human or a machine. If human generated, then the AR server computer 102 can receive some form of user identification from the human that generated the request. The user identification can include login credentials such as username, password, email address, and/or the like. The user identification can be associated with a visitor profile that includes one or more parameters, such as, for example, biographical data, address, web reputation, social media, or a combination thereof.

The user profile can be a measure of reputability of the visitor. For example, if a user accessing an AR map via an email login clicks on a virtual doorbell on the AR map, the AR server computer 102 can connect to the VR server computer 106 associated with a particular residence. Also, the AR server computer 102 can notify the VR server computer 106 that the request is from a verified user or an anonymous user, as the case may be.

After a visitor request has reached the VR server computer 106, the visitor can communicate with an avatar that may present questions to the visitor and vice versa. While the avatar is present, the VR server computer 106 can parse the visitor responses to questions. Parsing the visitor responses and extracting the semantic content can enable the VR server computer 106 to take appropriate action regarding access to the residence. A parallel with the real world is a hostess opening the front door and assessing a visitor based upon appearance, the nature of the communication/request, and/or other information. Usually in the real world case, a few questions/responses back and forth suffice to assess the situation (e.g., respond to the visitor request, invite the visitor inside, or decline entry). The parallel in virtual world is a set of pre-determined rules for the avatar to act upon, based on one or more rules.

In some embodiments, each communication source can be assigned a rank based upon the authenticity and credibility of the source. In general, family, friends and other pre-qualified sources can be assigned a higher rank than unknown visitors. Multiple factors can be applied in determining the credence index ranking such as, for example, proof of physical address, proof of web presence, validated email, social network credibility, follower list, blogs, combinations thereof, and the like. In some embodiments, the credence index ranking has local significance. In other words, a visitor with a high credence index ranking who is known to a first user (associated with a first residence) may be an unknown visitor (i.e., low or no credence ranking) to a second user (associated with a second residence).

In a first example scenario, a visitor is an out-of-towner moving into a neighborhood and he or she wants to contact residents in the vicinity. The following is an interaction that might take place in this example scenario:

Visitor—"I am new to the area. I just wanted to say Hi. Here is a link to my profile."

Avatar—"This is the Smith residence. Welcome to the neighborhood! What is your address and contact information?

The VR server computer 106 processes the information provided by the visitor.

Avatar—"Thank you for the information. I'll pass it on to the Smiths."

The VR server computer 106 verifies the credentials and then passes the data to house occupant.

In a second example scenario, a visitor is an imposter trying to gain unauthorized access to the VR server computer 106. The following is an interaction that might take place in this example scenario:

Visitor—"Hi, I am from the neighborhood, house # . . . I just wanted to get to know y' all better."

The VR server computer 106, executing the credential evaluation application 136, can determine based upon the visitor profile (or lack thereof) that the visitor is likely an imposter.

Avatar—In response, the avatar can respond to the visitor with "Sorry, we are busy."

The rules engine application 140 can employ one or more if-then conditions to determine an access level the VR server computer 106 should provide to a given visitor. An example rules engine logic that may be employed by the rules engine application 140 in accordance with an embodiment is shown in Table 1 below.

TABLE 1

Example Rules Engine Logic

| If the Visitor Type is . . . | Credence Index Ranking | Access Level |
| --- | --- | --- |
| Friend, Family, or previously accessed | 5 Stars | Allow full access to the residence and any services and data provided in association with the residence |
| A person with a verified reputation though not personally known to a resident of the residence (e.g., the person may be a visitor from the neighborhood or from within a pre-defined proximity to the residence of interest) | 4 Stars | Allow access to one or more specific areas of the residence. (e.g., a friend of a son or daughter of the house may visit a room of the son or daughter as well as a common area, such as a foyer) |
| Bills and official correspondence from authenticated sources | 5 Stars | Forward to the appropriate house resident per rules that have been established (e.g., credit card and/or other monthly bills and/or notifications thereof can be sent to a resident's computer and/or other device(s) such as a smartphone and/or tablet) |
| Sales requests, coupons, petition signing, neighborhood watch, lost pets | 2 Stars | Forward to a pre-designated location within the virtual residence (e.g., grocery coupons and/or notifications thereof can be sent to a resident's computer and/or other device(s) such as a smartphone and/or tablet) |

TABLE 1-continued

Example Rules Engine Logic

| If the Visitor Type is . . . | Credence Index Ranking | Access Level |
|---|---|---|
| Unknown visitor but credentials indicate the source is authentic | 3 Stars | Pre-determined level of access, such as, for example, entry to a foyer area, may leave messages for resident(s) but may not be able to view, listen to, or otherwise interact with personal information associated with the resident(s) (e.g., family photographs, bills, and other personal information is unavailable) |
| Unknown visitors | 1 Star | Allow access to walled garden area only and not beyond. Request(s) can be forwarded to a designated area and/or directly to the resident's computer and/or other device(s) such as a smartphone and/or tablet to notify the resident of the attempted access by the unknown visitor(s) |
| Junk mail, bots | 0 Stars | Block access and discard |

In some embodiments, a user may not login to the AR server computer 102 but instead may access AR maps anonymously. In these embodiments, the reputation of the user can be set to the lowest value, but the reputation could be improved during the interaction with the avatar based on the response(s) provided by the user.

The visitor request may be in the form of an intelligent avatar visiting the VR environment. The visitor request could also be to access/communicate with one or more home appliances. For example, the VR server computer 106 may display the home appliance(s) in the VR environment and the visitor request is to obtain data from a specific appliance. The services in this category may include, for example, a grocery store computer accessing a refrigerator to get an inventory or a home appliance being accessed for a software upgrade. The VR environment may not depict the actual physical layout, hence no security risk.

Returning to the description of the user device 104, the VR app 124 can be a client-side application that communicates, via the network 108, with the VR server application 132 executing on the VR server computer 106 to provide, at least in part, a VR service to the user of the user device 104. For example, the VR app 124 can communicate with the VR server application 132 to obtain data associated with a VR environment for presentation to the user.

The VR app 124, in some embodiments, can utilize the VR component 128 to provide, at least in part, a VR service to the user of the user device 104. The illustrated embodiment of the VR component 128 represents the VR component 128 as an internal component of the user device 104. It should be understood that the VR component 128 alternatively may be an external component that is in communication with the user device 104 via a wired or wireless connection. The VR component 128, in some embodiments, is or includes a display (e.g., an integrated display, a head-mounted display, an eyeglasses display, a head-up display, an external monitor, a projection system, or a holographic display), an input device, a combination thereof, or the like. In some embodiments, the VR component 128 is OCULUS RIFT (available from OCULUS VR), SAMSUNG GEAR VR (available from SAMSUNG and OCULUS VR), GOOGLE CARDBOARD (available from GOOGLE), MICROSOFT HOLOLENS (available from MICROSOFT), or the like. The VR app 124 can provide an interface, using the VR component 128, through which the user can interact with a VR environment provided by the VR server computer 106.

FIG. 1 illustrates one AR server computer 102, one user device 104, one VR server computer 106, one network 108, and one credential evaluation server computer 144. It should be understood, however, that various implementations of the operating environment 100 include multiple AR server computers 102, multiple user devices 104, multiple VR server computers 106, multiple networks 108, and/or multiple credential evaluation server computer 144. As such, the illustrated embodiment should be understood as being illustrative, and should not be construed as being limiting in any way.

Turning now to FIG. 2, a diagram illustrating aspects of an AR environment 200 provided, at least in part, by the AR server computer 102 to the user device 104 will be described, according to an illustrative embodiment. The AR environment 200 can be generated by the AR server computer 102 as described above. The AR server computer 102 can provide the AR environment 200 to the AR app 122 executing on the user device 104. The AR app 122 can present the AR environment 200 to the user via the AR component 126.

The illustrated AR environment 200 includes a plurality of houses 202A-202E (collectively, "houses 202"), each of which is associated with a virtual doorbell augmentation 204A-204E (collectively, "virtual doorbell augmentations 204"), respectively. Each of the virtual doorbell augmentations 204 in the illustrated embodiment is a street sign that includes a partial physical address for the corresponding house. The virtual doorbell augmentations 204 can take other forms such as described above. Some other non-limiting examples of forms for the virtual doorbell augmentations 204 include a door image, a doorbell image, a selectable portion of the corresponding house, a user-selected image, or the like.

Turning now to FIG. 3, a diagram illustrating aspects of a transition 300 from the AR environment 200 provided, at least in part, by the AR server computer 102 to a VR environment 302 provided, at least in part, by the VR server computer 106 will be described, according to an illustrative embodiment. The AR environment 200 can be generated by the AR server computer 102 as described above. The AR server computer 102 can provide the AR environment 200 to the AR app 122 executing on the user device 104. The AR app 122 can present the AR environment 200 to the user via the AR component 126. In the illustrated example, the user has selected the virtual doorbell augmentation 204C as shown by a cursor 304 hovering over the virtual doorbell augmentation 204C. The cursor 304 is shown to illustrate the selection of the virtual doorbell augmentation 204C. It should be understood, however, that other methods of selection such as touch, voice, and gesture are also contemplated as possible interactions by the user with the AR app 122 to effect the selection. As such, the illustrated example of the cursor 304 being used to select the virtual doorbell augmentation 204C should not be construed as limiting in any way.

After selecting the virtual doorbell augmentation 204C, the AR server computer 102 can generate a request to access the VR server computer 106 that is associated with the physical address that, in turn, is associated with the virtual doorbell augmentation 204C. The request can include a request to access at least a portion of a VR environment provided by the VR server computer 106. The request can also include credentials (e.g., username, password, and/or the like) to be evaluated by the credential evaluation application 136 and/or the credential evaluation server computer 144 to determine an access level for the visitor associated with the request. As described above, the VR server computer 106 can utilize the walled garden application 134 while the credential evaluation application 136 and/or the credential evaluation server computer 144 evaluates any credentials provided in the request.

In the illustrated example, the VR server computer 106 has generated a walled garden area 306 in which an avatar 308 is made available to the visitor. The avatar 308 may resemble a human as in the illustrated example or may resemble another animal, a fictional character, a historical character, a shape, or any other object. In some implementations, the avatar 308 may resemble an individual who lives in the house 202C. The avatar 308 may be able to engage the visitor with written or spoken dialogue to provide information to the visitor.

After the credential evaluation application 136 and/or the credential evaluation server computer 144 determines an access level for the visitor, the VR server computer 106 can permit the visitor to access the VR environment 302. In the illustrated example, the visitor is provided full access to the VR environment 302 provided by the VR server computer 106, and as such, the visitor can leave the walled garden area 306 of the VR environment 302 and can enter a full access area 310 of the VR environment 302. If the visitor is provided limited access to the VR environment 302, the visitor can leave the walled garden area 306 and enter a portion of the virtual reality environment 302 corresponding to the level of access given to the visitor. If the user is provided no further access to the VR environment 302, the visitor can be allowed to stay in the walled garden area 306, or may be prevented from further access even to the walled garden area 306.

Figure 4:
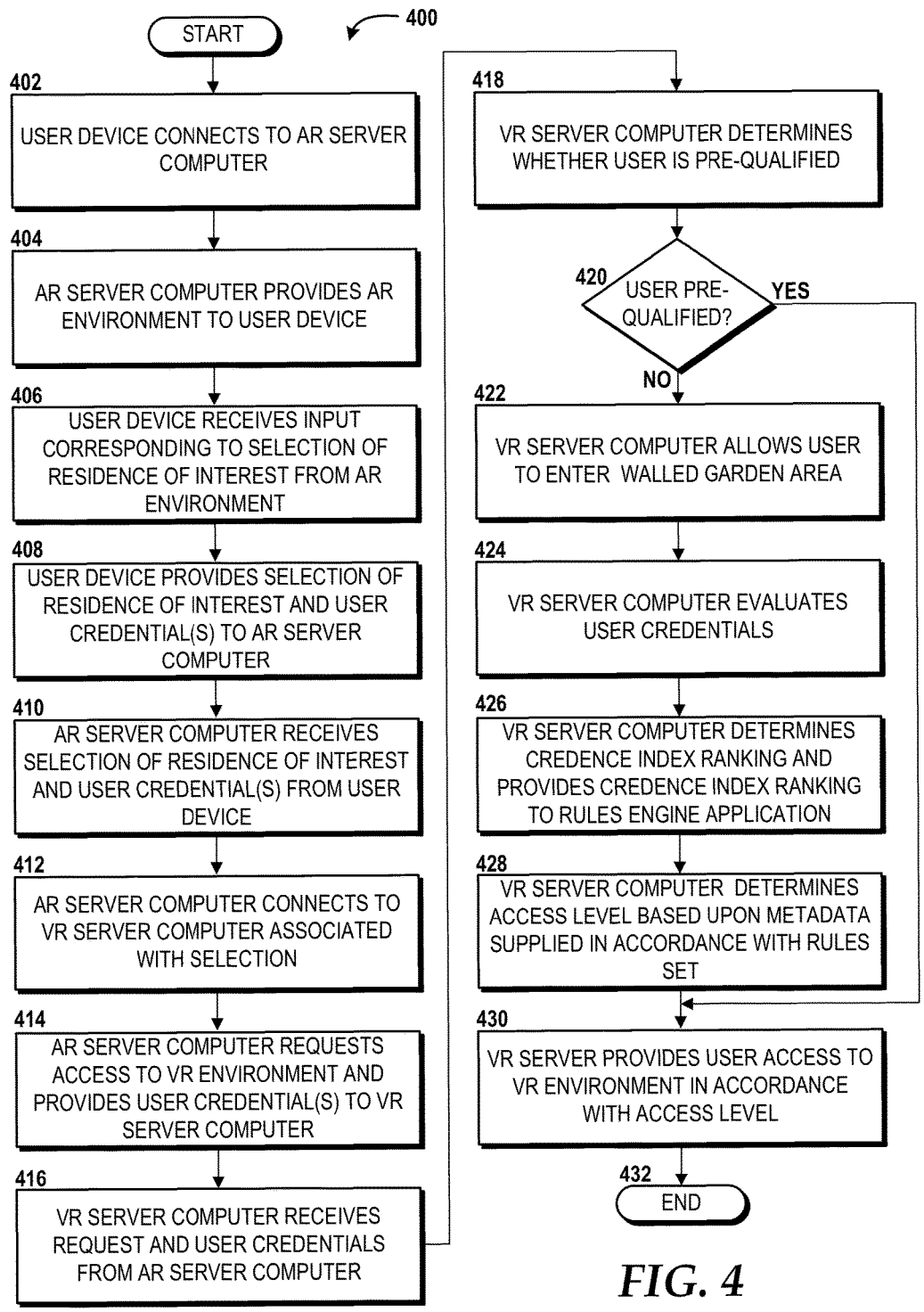
FIG. 4 is a flow diagram illustrating aspects of a method for providing access to a VR environment via a virtual doorbell augmentation, according to an illustrative embodiment.

Turning now to FIG. 4, aspects of a method 400 for providing access to a VR environment, such as the VR environment 302, via a virtual doorbell augmentation, such as one of the virtual doorbell augmentations 204, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the AR server computer 102, the user device 104, the VR server computer 106, the credential evaluation server computer 144, single-processor or multiprocessor systems, minicomputers, mainframe computers, personal computers, handheld computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the AR server computer 102, the user device 104, the VR server computer 106, or the credential evaluation server computer 144, to perform one or more operations and/or causing the processor to direct other components of the computing system or device to perform one or more of the operations.

For purposes of illustrating and describing some of the concepts of the present disclosure, the methods disclosed herein are described as being performed, at least in part, the AR server computer 102, the user device 104, the VR server computer 106, the credential evaluation server computer 144, or a combination thereof, via execution of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will be described with reference to FIG. 4 and further reference to FIGS. 1-3. The method 400 begins at operation 402, where the user device 104 connects to the AR server computer 102 via the network 108. In particular, the user device 104 can execute the AR app 122 (client-side) to communicate with the AR server application 112 (server-side) executing on the AR server computer 102 to establish a connection between the user device 104 and the AR server computer 102 via the network 108.

From operation 402, the method 400 proceeds to operation 404, where the AR server computer 102, via execution of the AR server application 112, provides at least a portion of an AR environment, such as the AR environment 200 (best shown in FIGS. 2 and 3), to the user device 104. The user device 104 can present at least the portion of the AR environment to a user via the AR app 122. In some embodiments, presentation of at least the portion of the AR environment to the user via the AR app 122 can be performed, at least in part, via instructions provided by the AR app 122 to the AR component 126. As described above, the AR app 122 can communicate with the AR server application 112 to obtain augmentation data that is stored in the augmentation data store 118. The augmentation data can be used to augment a reality perceived by the user device 104 (e.g., via a video camera component of the user device 104). The AR app 122 also can communicate, via the network 108, with the mapping service application 114 executing on the AR server computer 102 to retrieve one or more maps to which the augmentation data obtained from the augmentation data store 118 can be applied by the AR app 122. The AR app 122 also can communicate, via the network 108, with the AR server application 112 to obtain one or more AR maps.

From operation 404, the method 400 proceeds to operation 406, where the user device 104 receives input, via the AR app 122, corresponding to a selection of a residence of interest from the AR environment. For example, turning briefly to FIG. 2, the user device 104 can receive input of a selection of one of the houses 202 via a selection of a corresponding one of the virtual doorbell augmentations 204.

From operation 406, the method 400 proceeds to operation 408, where the user device 104 provides the selection of the residence of interest and, optionally, one or more user credentials to the AR server computer 102. From operation 408, the method 400 proceeds to operation 410, where the AR server computer 102 receives the selection of the residence of interest and, if available, the user credential(s) from the user device 104.

From operation 410, the method 400 proceeds to operation 412, where the AR server computer 102 connects to a VR server computer associated with the selection of the residence of interest. Extending the example shown in FIGS. 1-3, the VR server computer associated with the selection of the residence of interest will be described as the VR server computer 106 associated with the selection of the house 202C via the virtual doorbell augmentation 204C. This example is provided for ease of explanation and should not be construed as being limiting in any way.

From operation 412, the method 400 proceeds to operation 414, where the AR server computer 102 requests access to a VR environment, such as the VR environment 302, provided by the VR server computer 106. Also at operation 414, the AR server computer 102 can optionally provide the user credential(s) received from the user device 104. Alternatively, the AR server computer 102 can instruct the user device 104 to provide the user credential(s) directly to the VR server computer 106 along with a network address associated with the VR server computer 106. From operation 414, the method 400 proceeds to operation 416, where the VR server computer 106 receives the request and, if available, the user credential(s) from the AR server computer 102.

From operation 416, the method 400 proceeds to operation 418, where the VR server computer 106 determines whether the user associated with the request is pre-qualified. For example, the VR server computer 106 can access the local credential data store 138 to determine whether the user associated with the user credential(s) has previously accessed the VR server computer 106 or is otherwise pre-qualified to access at least a portion of the virtual reality environment 302. If the VR server computer 106 determines, at operation 418, that the user associated with the user credential(s) has not previously accessed the VR server computer 106 or is otherwise not pre-qualified to access at least the portion of the virtual reality environment 302, the method 400 proceeds from operation 420 to operation 422.

At operation 422, the VR server computer 106 allows the user to enter a walled garden area, such as the walled garden area 306 (shown in FIG. 3). While in the walled garden area 306, the VR server computer 106, at operation 424, can execute the credential evaluation application 136 to evaluate the user credential(s). From operation 424, the method 400 proceeds to operation 426, where the VR server computer 106, via execution of the credential evaluation application 136, determines a credence index ranking based upon the user credential(s). Also at operation 426, the credential evaluation application 136 provides the credence index ranking to the rules engine application 140.

From operation 426, the method 400 proceeds to operation 428, where the VR server computer 106 determines, via execution of the rules engine application 140, an access level to provide to the visitor based upon data supplied in accordance with a rules set. From operation 428, the method 400 proceeds to operation 430, where the VR server computer 106 provides the visitor with access to the VR environment 302 in accordance with the access level determined at operation 428.

From operation 430, the method 400 proceeds to operation 432. At operation 432, the method 400 ends.

Returning to operation 418, if the VR server computer 106 determines that the user associated with the user credential(s) has previously accessed the VR server computer 106 or is otherwise pre-qualified to access at least the portion of the virtual reality environment 302, the method 400 proceeds from operation 420 to operation 432, where the method 400 ends.

Figure 5:
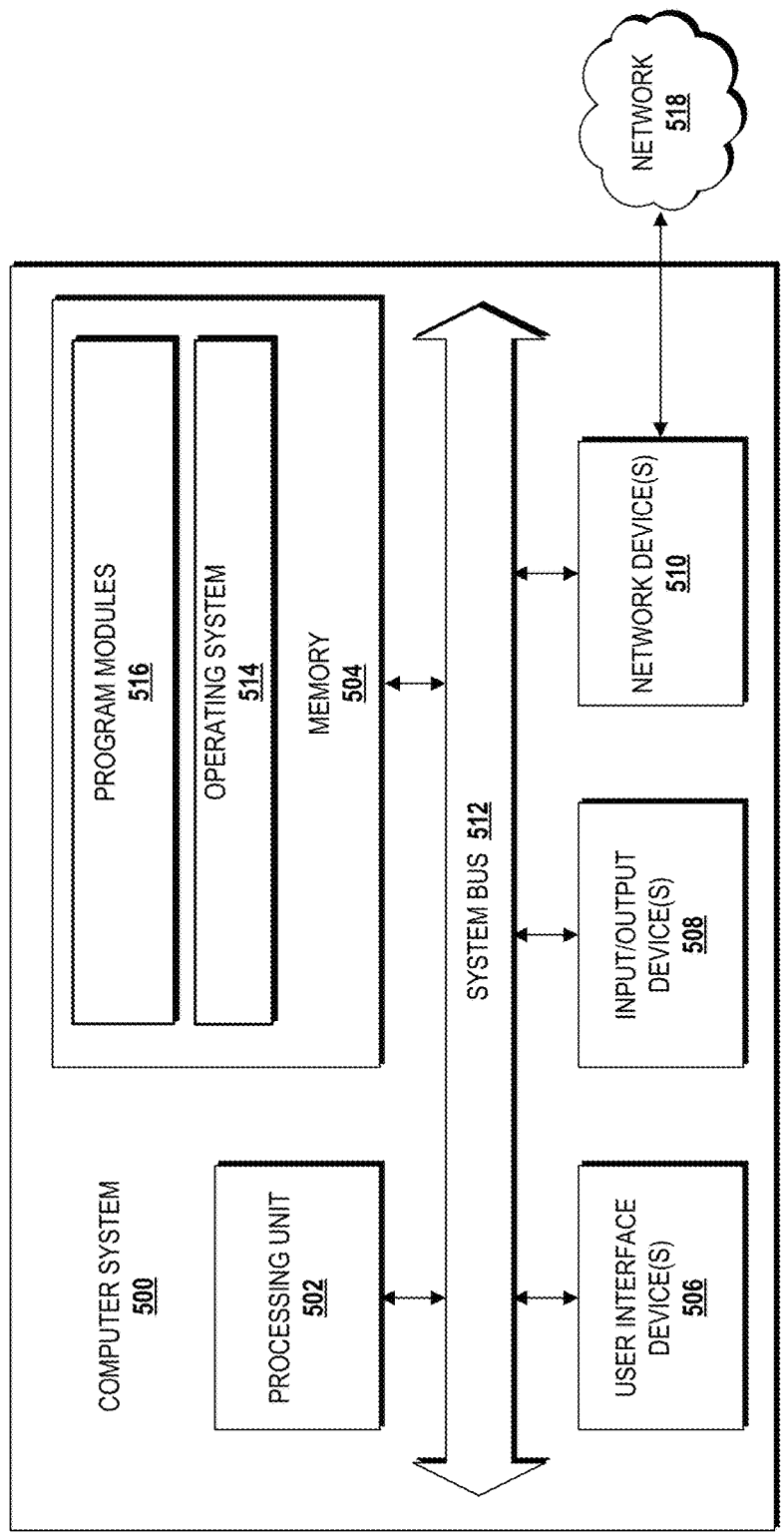
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some implementations, the AR server computer 102, the user device 104, the VR server computer 106, and/or the credential evaluation server computer 144 utilize an architecture that is the same as or similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like. The operating system 514 can be the AR server OS 110 as illustrated and described with reference to FIG. 1.

The program modules 516 may include various software and/or program modules to perform the various operations described herein. The program modules 516 for the computer system 500 embodied as the AR server computer 102 can include the AR server application 112 and/or the mapping service application 114. The program modules 516 for the computer system 500 embodied as the user device 104 can include the AR app 122 and/or VR app 124. The program modules 516 for the computer system 500 embodied as the VR server computer 106 can include the VR server application 132, the walled garden application 134, the credential evaluation application 136, and/or the rules engine application 140. The program modules 516 and/or other programs can be embodied in computer-readable media containing instructions that, when executed by the processing unit 502, perform one or more operations, such as the operations described herein above with reference to the method 400 illustrated in FIG. 4. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 518, such as the network 108 (best shown in FIG. 1). Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 518 may be a wired network such as, but not limited to, a wide area network ("WAN"), a wired LAN such as provided via Ethernet, a wired personal area network n ("PAN"), or a wired metropolitan area network ("MAN").

Figure 6:
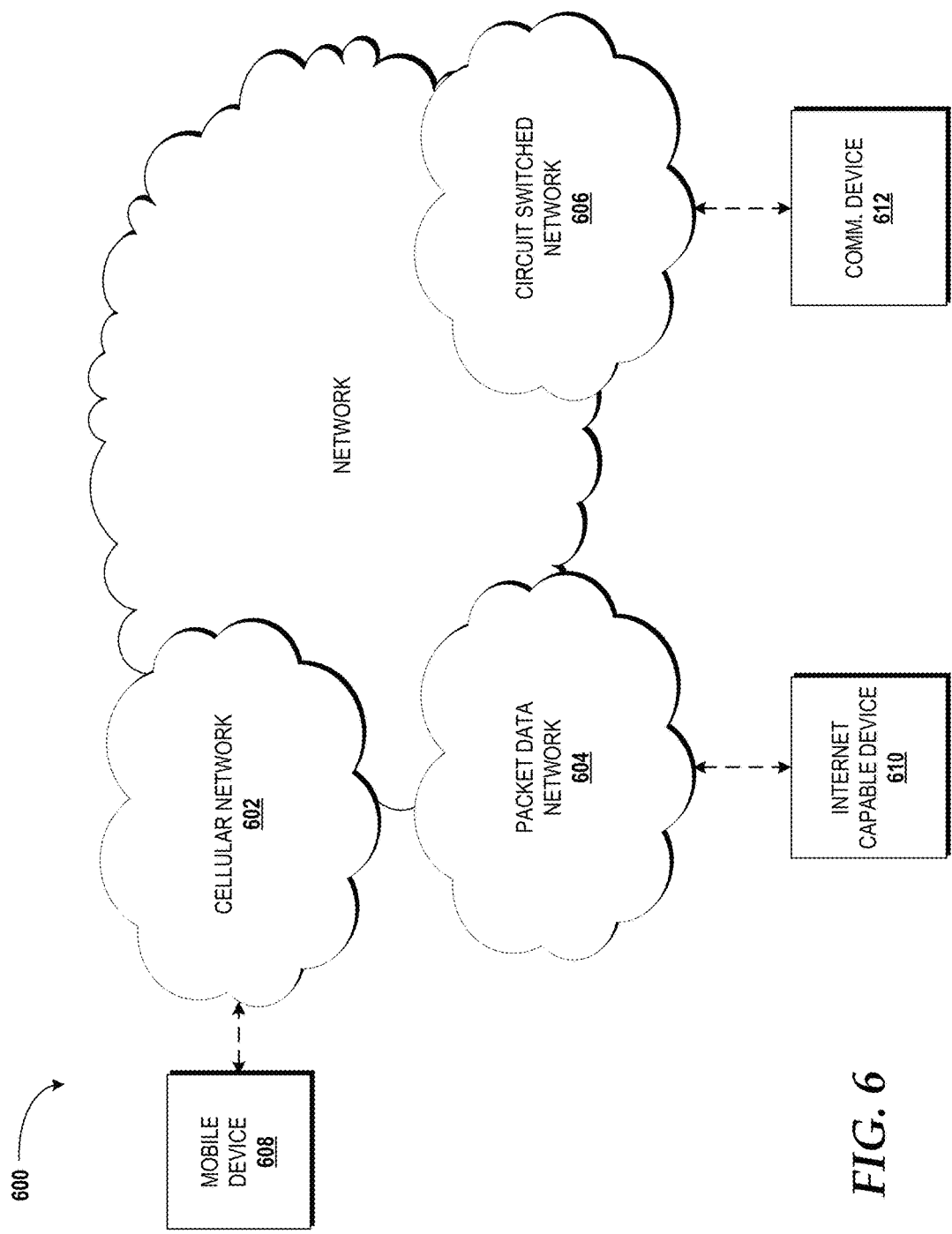
FIG. 6 schematically illustrates a network, according to an illustrative embodiment.

Turning now to FIG. 6, additional details of a network 600, such as the network 108, are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HS Ss"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the user device 104, a cellular telephone, a user equipment, a mobile terminal, a PDA, a laptop computer, a handheld computer, and combinations thereof, can be operatively connected to the cellular network 602. The cellular network 602 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 602 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 602 also is compatible with 4G mobile communications standards such as Long-Term Evolution ("LTE"), or the like, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the user device 104, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Figure 7:
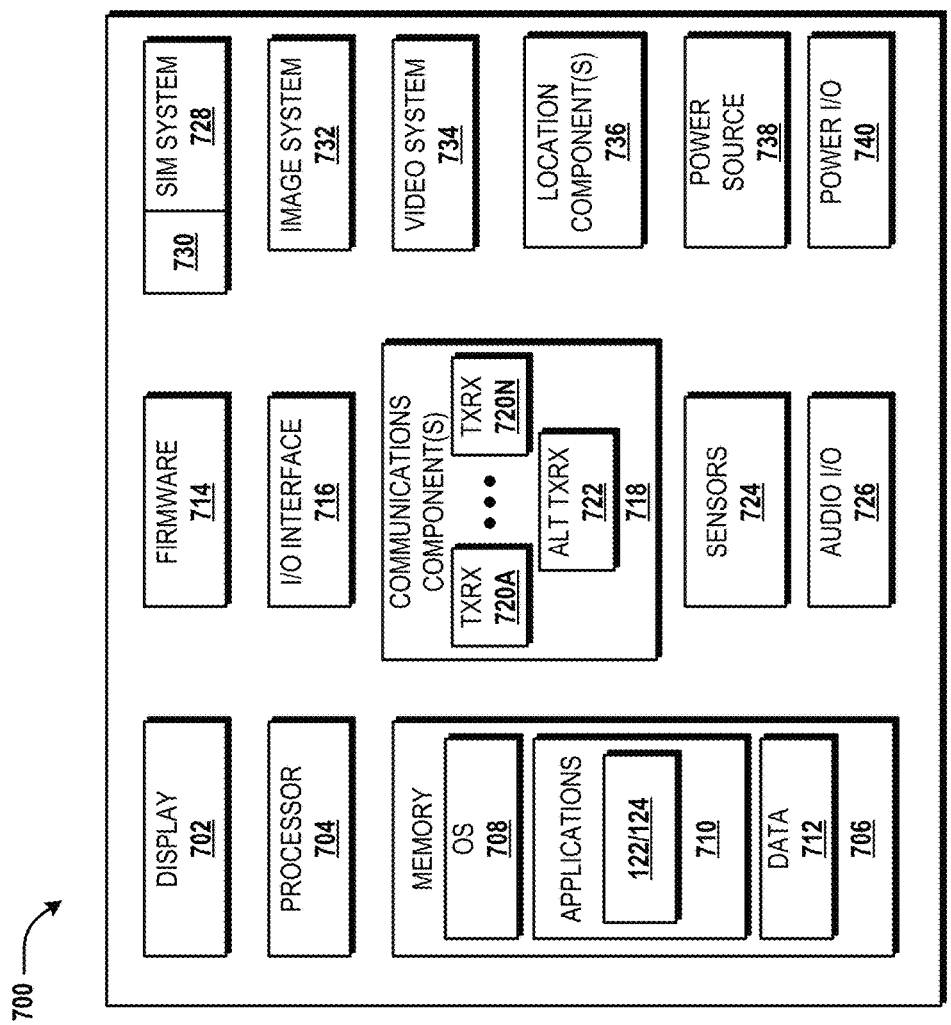
FIG. 7 is a block diagram illustrating an example mobile device and components thereof, according to an illustrative embodiment.

Turning now to FIG. 7, an illustrative mobile device 700 and components thereof will be described. In some embodiments, the user device 104 described above with reference to FIG. 1 can be configured as and/or can have an architecture similar or identical to the mobile device 700 described herein in FIG. 7. It should be understood, however, that the user device 104 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708 (e.g., the device OS 120), one or more applications 710 (e.g., the AR app 122 and/or the VR app 124), other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700.

According to various embodiments, the applications 710 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, the AR component 126, the VR component 128, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks described above herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMA, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, the sensor devices 108, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from GPS devices, A-GPS devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that concepts and technologies directed to virtual doorbell augmentations for communications between AR and VR environments have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. An augmented reality server computer comprising:
a processor; and
a memory that stores instructions that, when executed by the processor, cause the processor to perform operations comprising:
providing an augmented reality environment to a user device, the augmented reality environment comprising a view of a physical, real-world environment and a virtual doorbell augmentation applied to at least a portion of a residence depicted in the view of the physical, real-world environment,
receiving, from the user device, a selection of the virtual doorbell augmentation, and
in response to receiving the selection of the virtual doorbell augmentation, providing, to a virtual reality server computer associated with the residence, a request to access a virtual reality environment provided by the virtual reality server computer, wherein the request comprises a credential used by the virtual reality server computer to determine one of a plurality of levels of access to the virtual reality environment to grant to the user device, wherein the user device is provided access to a walled garden area of the virtual reality environment while the virtual reality server computer determines the one of the plurality of levels of access to the virtual reality environment to grant to the user device.

2. The augmented reality server computer of claim 1, wherein the view of the physical, real-world environment comprises a live view of the physical, real-world environment.

3. The augmented reality server computer of claim 1, wherein the view of the physical, real-world environment comprises a non-live view of the physical, real-world environment.

4. The augmented reality server computer of claim 1, wherein the virtual doorbell augmentation comprises a virtual object overlay.

5. The augmented reality server computer of claim 1, wherein the virtual doorbell augmentation comprises a spatially integrated virtual object.

6. The augmented reality server computer of claim 1, wherein the walled garden area of the virtual reality environment comprises a designated portion of the virtual reality environment.

7. The augmented reality server computer of claim 1, wherein the walled garden area of the virtual reality environment comprises an avatar.

8. A computer-readable storage medium comprising computer-executable instructions that, when executed by a processor of an augmented reality server computer, cause the augmented reality server computer to perform operations comprising:
providing an augmented reality environment to a user device, the augmented reality environment comprising a view of a physical, real-world environment and a virtual doorbell augmentation applied to at least a portion of a residence depicted in the view of the physical, real-world environment;
receiving, from the user device, a selection of the virtual doorbell augmentation; and
in response to receiving the selection of the virtual doorbell augmentation, providing, to a virtual reality server computer associated with the residence, a request to access a virtual reality environment provided by the virtual reality server computer, wherein the request comprises a credential used by the virtual reality server computer to determine one of a plurality of levels of access to the virtual reality environment to grant to the user device, wherein the user device is provided access to a walled garden area of the virtual reality environment while the virtual reality server computer determines the one of the plurality of levels of access to the virtual reality environment to grant to the user device.

9. The computer-readable storage medium of claim 8, wherein the view of the physical, real-world environment comprises a live view of the physical, real-world environment.

10. The computer-readable storage medium of claim 8, wherein the view of the physical, real-world environment comprises a non-live view of the physical, real-world environment.

11. The computer-readable storage medium of claim 8, wherein the virtual doorbell augmentation comprises a virtual object overlay.

12. The computer-readable storage medium of claim 8, wherein the virtual doorbell augmentation comprises a spatially integrated virtual object.

13. The computer-readable storage medium of claim 8, wherein the walled garden area of the virtual reality environment comprises a designated portion of the virtual reality environment.

14. The computer-readable storage medium of claim 8, wherein the walled garden area of the virtual reality environment comprises an avatar.

15. A virtual reality server computer comprising:
a processor; and
a memory that stores instructions that, when executed by the processor, cause the processor to perform operations comprising:
receiving, from an augmented reality server computer, a request to access a virtual reality environment associated with a residence, the request being made in response to a selection, received by a device, of a virtual doorbell augmentation of an augmented reality environment provided by the augmented reality server computer, wherein the request comprises a credential, and
in response to receiving the request,
determining, based at least in part on the credential, one of a plurality of levels of access to the virtual reality environment to grant to the device, and
providing the device access to a walled garden area of the virtual reality environment while determining the one of the plurality of levels of access to the virtual reality environment to grant to the device.

16. The virtual reality server computer of claim 15, wherein the walled garden area of the virtual reality environment comprises a designated portion of the virtual reality environment.

17. The virtual reality server computer of claim 15, wherein the walled garden area of the virtual reality environment comprises an avatar.

18. The virtual reality server computer of claim 15, wherein determining the one of the plurality of levels of access to the virtual reality environment to grant to the device comprises:
determining, based at least in part on the credential, a credence index ranking; and
utilizing the credence index ranking to determine the one of the plurality of levels of access to the virtual reality environment to grant to the device.

19. The virtual reality server computer of claim 15, wherein the operations further comprise providing access to the virtual reality environment in accordance with the one of the plurality of levels of access.

20. The virtual reality server computer of claim 15, wherein the operations further comprise providing instructions to a 3D printer located inside the residence to print a 3D printed object requested by the device to be left for a resident of the residence.

* * * * *